March 12, 1968 P. A. LORD 3,373,409

INFORMATION STORAGE UNIT AND MEMORY CARD THEREFOR

Filed April 20, 1965 2 Sheets-Sheet 1

INVENTOR
PHILIP A. LORD

BY Henry E. Otto Jr.

ATTORNEY

March 12, 1968 P. A. LORD 3,373,409

INFORMATION STORAGE UNIT AND MEMORY CARD THEREFOR

Filed April 20, 1965 2 Sheets-Sheet 2

United States Patent Office 3,373,409 Patented Mar. 12, 1968

3,373,409
INFORMATION STORAGE UNIT AND MEMORY CARD THEREFOR

Philip A. Lord, Vestal, N.Y., assignor to International Business Machines Corporation, New York, N.Y., a corporation of New York Filed Apr. 20, 1965, Ser. No. 449,432
5 Claims. (Cl. 340—173)

ABSTRACT OF THE DISCLOSURE

A card capacitor read only storage unit employing a printed circuit board and a printed circuit memory card having an insulating substrate which serves as the dielectric between capacitor tabs on said board and card and wherein said card is provided with test probe pads to facilitate checking without requiring removal from the unit and also edge strips to facilitate processing in conventional card punching and handling equipment.

*Background of the invention*

It has heretofore been proposed to provide a card capacitor read only storage unit employing an etched printed circuit board and a memory card having a conductive silver ink pattern of conductors thereon. The board and card have respective sets of conductive tabs arranged in columns and rows and adapted to overlie each other. The corresponding tabs of each set provide the respective one plates of unique capacitors at each bit-position-defining point of overlay. The tabs on the board are coated with an insulating film or varnish that serves as the dielectric for the capacitors. The tabs in each column on the board are serially connected, whereas the tabs in each row of the card are connected in parallel to a respective row line. Input signals, which are applied to the board via a suitable decode network, are directly electrically coupled to a corresponding selected row drive line; and thus the particular signal is transmitted along said drive line and capacitively coupled back in parallel to the board for reading out the binary information previously stored in the tabs parallel connected to said selected drive line. A binary "1" or "0" is provided at each bit position on the card according to whether the capacitor-plate-defining tab is present or absent at such bit position, with the result that capacitive coupling is possible only at those bit positions where the tab on the card remains intact.

While this previously proposed arrangement will operate satisfactorily for reasonable periods of time under ideal ambient conditions, it has been found that conventional tabulating cardstock printed with conductive silver ink does not have the necessary dimensional stability when used in damp or humid environments. Moreover, protracted exposure of the card to even normal ambient conditions eventually transforms the conductive silver ink into nonconductive AgS (silver sulphide) unless the card is coated with an epoxy or other sealant. Silver migration also takes place unless the card is coated. But if a sealant is used, it so increases the dielectric constant of the common dielectric separating the two sets of capacitor plates that the conductive drive-signal-receiving pad or areas at the end of each row line and also the conductive tabs connected in parallel in each row line must be enlarged in size to deilver a large enough signal. This undesirably reduces the bit capacity of the card and also may prevent spacing of the tabs on centers corresponding to the centers between tabs on conventional tabulating cardstock. This, in turn, would prevent the memory cards from being punched with conventional tabulating card punch apparatus at their maximum density capability.

To overcome the problems above described, and reduce resistivity in the drive lines, gold ink was printed over the conductive silver ink of each drive-signal-receiving pad (in an attempt to avoid the need for a sealant); but because the gold ink was thin and the card surface relatively rough, the gold was porous. This permitted the silver to migrate through the gold ink and resulted in an unreliable electrical contact.

It is therefore one object of this invention to provide an information storage unit of the above general type which operates reliably for long periods of time and is cheaper to manufacture than comparable apparatus heretofore proposed.

Another object is to provide an improved card capacitor read only storage unit embodying a memory document that is of improved composition and configuration to overcome the difficulties above described, can be used interchangably with conventional tabulating cardstock in card punches, sorters and other tabulating equipment, and can be tested for effectiveness while installed and without removal from the unit.

*Summary of the invention*

According to these objects, the improved read only storage unit comprises a memory document formed of an insulative substrate of plastic or epoxy, such as Mylar material, with good dimensional stability characteristics. One side of the substrate is clad with copper to provide an overall thickness equal to that of conventional tabulating cardstock. When a circuit pattern is etched in the copper, strips along opposite longitudinal edges are intentionally left unetched to maintain the thickness comparable to that of conventional cardstock so that certain edge-gripping feed rolls pre-gapped for cardstock may be used without readjustment to accommodate the memory document. However, a test probe pad is etched at one end of each row drive line to enable a test probe to be applied to the document while it is installed, so that the document may be tested and checked without requiring removal from the unit. The drive-signal-receiving pad etched at the other end of each row drive line is gold plated to assure optimum ohmic contact with a gold-plated wire staple. Unlike previously proposed storage units, input signals are transmitted from the printed circuit board via selectable pins to corresponding circuit lines etched in an electrostatic ground shield and terminating at the gold-plated staple. Moreover, the unclad insulated backside of the substrate abuts the tabs on the printed circuit board, thus serving as the common dielectric between the sets of capacitor tabs on the board and memory document. This provides a substantial reduction in cost because it obviates the necessity for specially coating the tabs on the board with dielectric-constituting varnish and/or other dielectric materials, such as Mylar material.

Other objects and advantages will become apparent from the following more detailed description of a preferred embodiment of the invention and from the accompanying drawings, wherein.

*Description*

Figure 1:
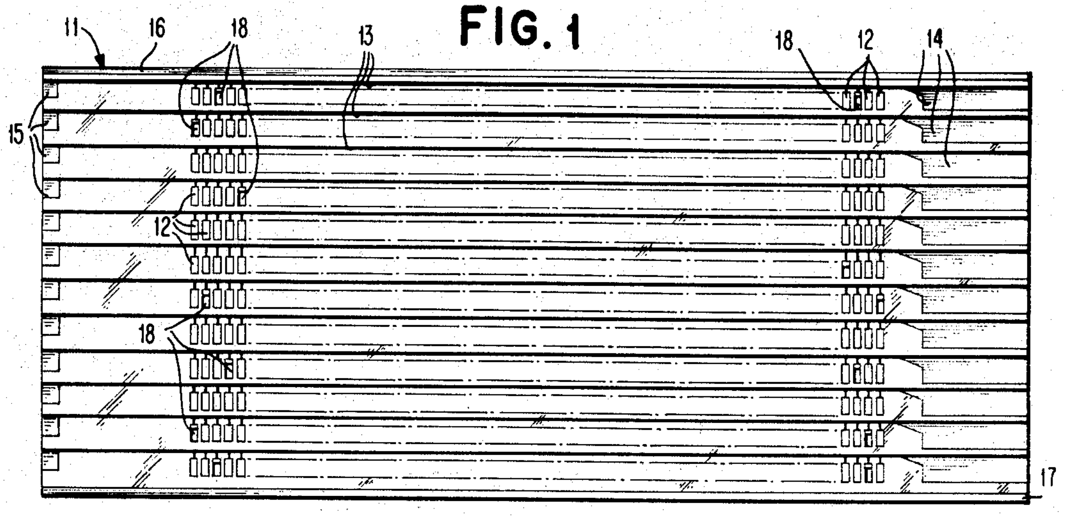
FIG. 1 is a plan view of a memory document forming a unique part of an information storage unit embodying the invention.

Referring first to FIG. 1, the information storage unit embodying the invention comprises a memory document 11 formed of an insulative substrate of plastic, such as Mylar material, or an epoxy which is flexible and of good dimensional stability. Adhered to one side of the substrate is a layer of suitable conductive metal, such as copper, to give the document 11 an overall thickness which preferably is substantially equal to that of a conventional IBM tabulating card. The copper layer is suitably etched (such as by well known photo-resist techniques) to provide a desired circuit pattern. This pattern includes a plurality of conductive tabs 12 arranged in columns and rows with all tabs in a particular row being connected in parallel to a respective row drive line 13, and all tabs being arranged on centers corresponding to those of conventional tabulating cards. Each row drive line is connected at one end to an elongated conductive area or pad 14, and is connected at the other end to a smaller conductive area constituting a test probe pad 15.

Adjacent the opposite longitudinal edges of the document 11 are strips 16, 17 which are intentionally left unetched so that conventional card punching and handling equipment having feed rolls or the like with preadjusted gaps may be used for punching or handling the memory document 11 (in the same manner as punched paper cardstock) without requiring readjustment of the gaps between such rolls. The pads 14 are preferably gold plated to assure the efficient transmission of the drive signals to a selectable one of said pads, in the manner presently to be described.

As illustrated, each memory document 11 has twelve drive lines 13 to provide twelve binary words, each having a number of bits corresponding to the number of columns of tabs 12 on the document. To denote a binary "0" at a particular bit position in a particular word, the tab 12 at such position is removed, such as by punching as indicated at 18 or, if preferred, by etching. However, to denote a binary "1" at a particular bit position in a word, the tab 12 is maintained intact to permit capacitive coupling at such bit position, in the manner hereinafter to be described.

Figures 3, 4:
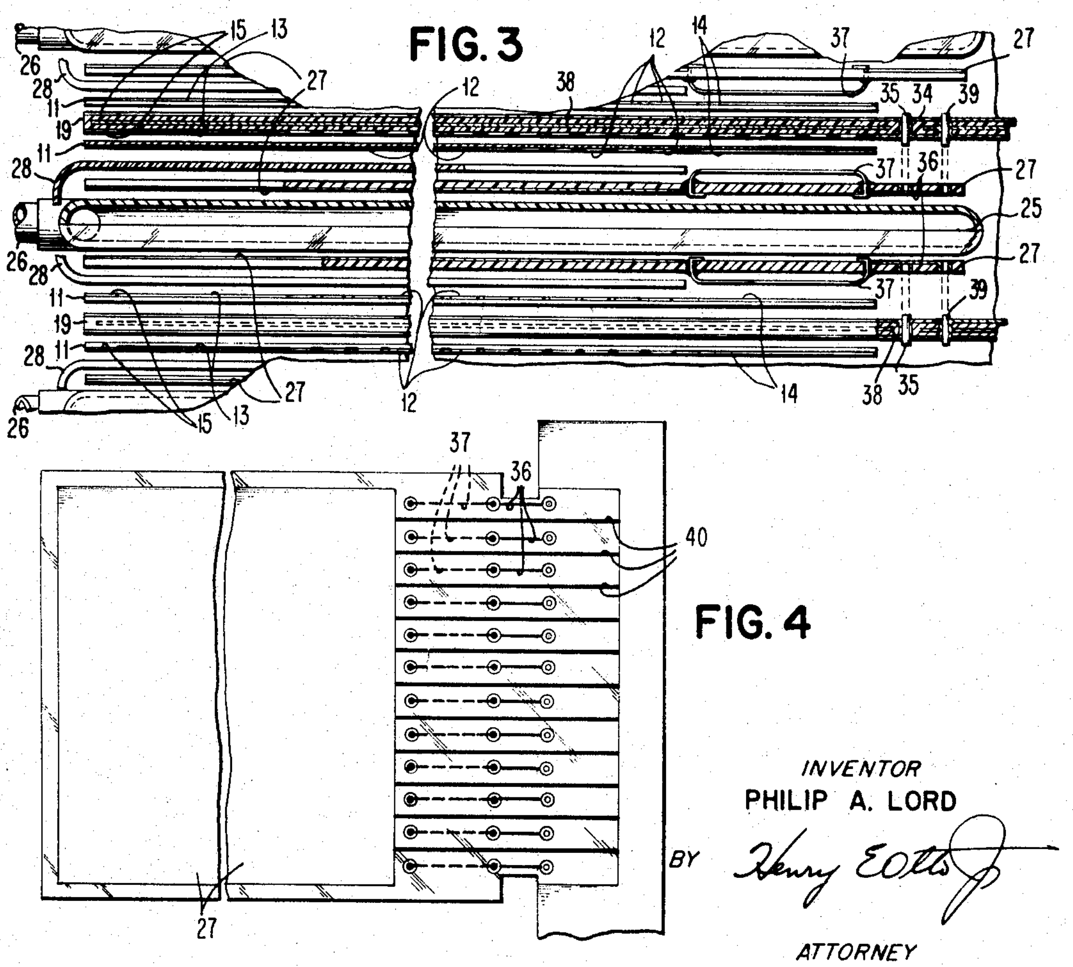
FIG. 3 is an exploded fragmentary view, to enlarged scale, taken generally along the lines 3—3 in FIG. 2, partially in section and partly in outline to limit the amount of sectioning required and thus facilitate study thereof.
FIG. 4 is a fragmentary plan view, to enlarged scale, of a portion of the electrostatic ground shield shown in FIG. 2 and 3.
Figure 2:
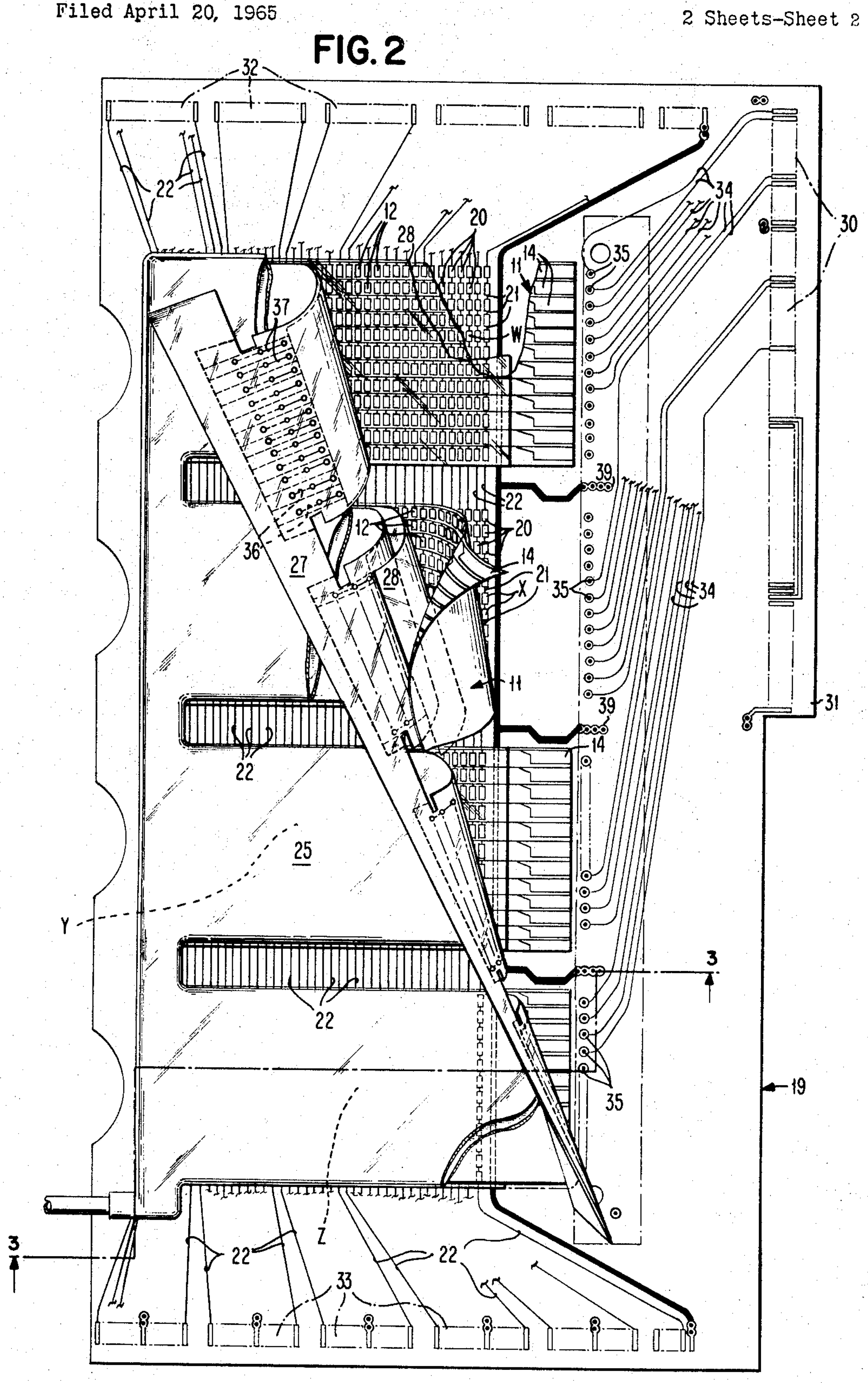
FIG. 2 is a plan view, to reduced scale, of a portion of the information storage unit with various components peeled back to expose the memory documents and dielectric sheet and electrostatic ground shield positioned between an etched board circuit and an inflatable air bag.

As illustrated in FIGS. 2 and 3, the storage unit also comprises a plurality of spaced, parallel, flat memory boards 19 preferably of identical configuration. Each board 11 preferably is of the multi-layer laminated type formed of two copper-clad glass epoxy layers. The epoxy acts as a rigid insulating substrate. The copper layer between the epoxy layers serves as an internal ground plane, whereas the outer layers of copper are suitably etched (such as by conventional photo-resist techniques) to provide desired circuit patterns on both exterior sides of the board (see FIGS. 2 and 3). The circuit pattern etched on each side of each memory board includes four spaced identical conductive areas W, X, Y, Z. Each area W, X, Y, Z comprises a plurality of columns of conductive tabs 20 arranged in twelve rows equal in number and spacing to the tabs 12 on each memory document 11. The tabs 20 in each respective row are electrically isolated from each other; but those in each particular column are serially connected to each other by links or leads 21 extending between the respective rows and by jumpers 22 extending between the respective areas W, X, Y, Z.

The tabs 12 on each memory document 11 are adapted to overlie the corresponding tabs 20 on a particular one of the areas W, X, Y, Z on the board. The tabs 12 constitute one set and the tabs 20 the other set of plates of unique capacitors, a separate one of which is defined at each coordinate point or bit position where a tab 12 overlies a tab 20. Suitable guide means (not shown) are secured to the boards 19 to provide guideways for receiving the cards and aligning them accurately so that the tabs 12 can and will overlie the corresponding tabs 20.

It is to be noted that the documents 11 are mounted such that the tabs face away from the board 19. This is so that the tabs 12 and 20 will not make direct ohmic contact, and the insulative substrate portion of the document (i.e., the backside of the document which is not clad with copper) will constitute the common dielectric between the sets of capacitor plates at those bit positions where the plates or tabs 12 are present. This eliminates the need for applying special dielectric film to the tab-providing portions of each board 19 or using a separate insulative sheet between the tabs 12 and 20 to constitute the common dielectric for the unique capacitors.

As best shown in FIG. 3, the storage unit further comprises a pressure-applying member, preferably in the form of an inflatable air bag 25, chargable with pressure fluid via a tube 26 from a suitable source (not shown). As this inflatable bag 25 expands laterally in opposite directions, it presses respective electrostatic ground shields 27 against corresponding sheets 28 of dielectric material, forcing them, in turn, against the tab-carrying (copper-clad) side of respective memory documents 11 to press said documents into planar contact with the circuit patterns etched on adjacent sides of the adjacent memory boards 19. These various elements are shown in FIG. 2 peeled back from one side of the memory board 19.

As illustrated in FIG. 2, a set of input terminals 30 is disposed along a projecting edge portion 31 of each board 19; and a dual set of output or sense terminals 32 and 33 are preferably provided along the upper and lower edges, respectively, of each board. The manner in which input or drive signals are decoded and supplied to a selected one of the input terminals 30, and are taken from either of the dual sets of output terminals (preferably along a common edge of the assembled unit) is fully shown and described in the copending application of Grubb, Haskell, Lord and Rent, U.S. Ser. No. 449,500, now Patent No. 3,355,722, being filed concurrently herewith and assigned to the assignee of the present invention.

For purposes of the present invention, it is sufficient to note that an input signal supplied via a selected input terminal 30 to a corresponding one of a plurality of conductive lines 34 on the memory board 19 is transmitted via a corresponding one of a plurality of driver pins 35 to a respective conductive line 36 on the associated ground shield 27. The signal is transmitted from the particular line 36 through a corresponding one of a plurality of gold-plated wire staples 37 to a corresponding one of the conductive tabs 14 on the memory document 11.

The pins 35 are soldered to the memory board 19 and adjacent ground shield 27; and the staples 37 are inserted into each ground shield and soldered. Note that the ground shield 27 is grounded by being connnected to the internal ground plane 38 of the adjacent memory board 19 via a plurality of pins 39. Additional circuit lines 40 (FIG. 4) on the ground shield 27 shield the driver lines 36 from each other and also interconnect the portions of the ground shield at each end of the staples 37 to assure that said portions will be maintained at ground potential.

Each ground shield 27 is preferably formed of plastic or other insulative material having a copper layer adhered to one side thereof. Each ground shield may be mounted with the copper layer facing the inflatable air bag 25, as illustrated; or, if preferred, it may be mounted with the copper layer facing the dielectric sheet 28. In either event, each shield 27 is provided to reduce crosstalk between word lines on the associated memory document 11. These shields 27 produce some capacitive loading on the driver circuits, thus adversely affecting their transient response; however, this adverse effect is minimized by making the dielectric sheets 28 of proper thickness. The dielectric sheets 28 are preferably hooked into or otherwise secured to separate sides of the inflatable air bags 25 at one end thereof, as illustrated in FIG. 3. This facilitates insertion of the memory documents into the spaces between the sheets 28 and boards 19; it being noted that said documents are inserted from the left end of the unit as viewed in FIGS. 2 and 3. Having the sheets 28 fixed to the air bag also desirably protects the air bag from puncture by tweezers or other instruments that may be used to change memory documents and from test probes that may be inserted from the left end of the unit to contact a selectable test probe pad 15 for test purposes. Affixing the sheets 28 also desirably isolates the ground shields 27 from tweezers and probes. In any event, whether or not the dielectric sheets 28 are affixed to the air bag 25, the air bag is configured to press each memory document 11 against the corresponding board 19 for applying a uniform pressure over the contact area and capacitor-plate providing areas of the document and board to assure that the dielectric constant will be maintained uniform.

In summary, a decoded input signal is transmitted from the board 19 via a selected input terminal 30, corresponding conductive line 34, pin 35, conductive line 36 and staple 37 to that particular conductive pad 14 for the document word line being addressed. The signal applied to the conductive pad 14 is transmitted along the associated row line 13 and capacitively coupled back in parallel, via each intact tab 12 along said row line, to the corresponding capacitor-plate-defining tabs 20 on the board 19. A binary "1" output signal will thus be developed at each tab 20 where the corresponding tab 12 remained intact and thus permitted capacitive coupling at such bit position in the selected word. A binary "0" (no output signal) will be produced where capacitive coupling is prevented by the removal or absence of the tab 12 at a particular bit position in a selected word. The output signals are transmitted from the respective row of tabs 20 on the board via the leads 21 and jumpers 22 to both sets of output terminals 32 and 33, essentially in parallel if the memory boards 19 are configured as herein illustrated to achieve a compact storage unit of the type and for the reasons fully disclosed in the aforementioned copending application.

Preferably, the two sets of output terminals 32 and 33 are provided to permit all output signals to be taken along one edge of the unit even though every other one of the identical memory boards 19 is turned upside down to create the staggered "W-like" arrangement of projecting portions 31 along one edge of the unit, so that adjacent memory boards may be spaced more closely than the width of the adapter sockets or other members (not shown) which are edge-mounted to said projecting portions as taught in said copending application. Of course, it will be understood that, if preferred, only one set of output terminals (e.g., 32) need be provided for receiving the output signals.

Also, as above indicated, the particular manner in which the input and output signals are decoded is not pertinent to the present invention; however, such decoding may, if desired, be effected in the manner fully disclosed in said copending application.

It will thus be seen that, according to the present invention, the improved memory document 11 provides reliable ohmic contact between the board and document by use of the gold-plated copper conductive tabs 14 and gold-plated wire staples 37. Also with the improved memory document, there is no deterioration in effectiveness due to silver migration, and the number of bits per word can be maximized because of the reliable transmission of drive and sense signals resulting, in part, from reduced resistivity of the various conductive lines. Also, the test probe pads 15 enable the drive signal to any document word to be tested while the documents are in place. This is highly desirable because the unit is very compact and there is no direct access to the drive pins 35 while the unit is assembled. In addition, the documents are capable of being punched or processed in the same manner as conventional tabulating cards made of paperstock.

Moreover, the information storage unit embodying the invention is cheaper to manufacture than units heretofore proposed because, among other reasons, the tab-providing-areas of each memory board do not have to be selectively coated with dielectric.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An information storage unit comprising two elements having respective sets of overlying conductive tabs arranged in columns and rows to provide the respective two plates of unique capacitors at each point of overlay, the tabs of each column on one of the elements being connected serially, and all tabs in each respective row of the other element being connected in parallel via a respective row drive line to a corresponding drive-signal-receiving pad at one end of such drive line, characterized by:

said other element being formed of a plastic substrate having adhered to one side thereof copper circuitry including the tabs, pads and row drive lines, said pads being gold plated at least in their contact-providing areas, predetermined tabs on said other element being removed to provide a distinctive pattern of binary coded information, one of the plates of a unique capacitor at a selected bit position being eliminated to prevent capacitive coupling at such position and thus denote a binary "0," and a binary "1" being denoted at each such bit position where the tabs on said other element remain intact to permit capacitive coupling, the other side of the substrate having no conductive circuitry and being disposed in contact with said one element to constitute the dielectric between the respective sets of capacitors, said other element having a respective test probe pad that is formed at the end of each row drive line remote from the drive-signal-receiving pad and which is accessible by a test probe without disassembly of the unit, and said other element being substantially the same size as a conventional tabulating card and having tabs spaced on centers corresponding to the spacing between bits on such tabulating card.

2. An information storage unit comprising two elements having respective sets of overlying conductive tabs arranged in columns and rows to provide the respective two plates of unique capacitors at each point of overlay, the tabs of each column on one of the elements being connected serially, and all tabs in each respective row of the other element being connected in parallel via a respective row drive line to a corresponding drive-signal-receiving pad at one end of such drive line, characterized by:

said other element being formed of a plastic substrate having adhered to one side thereof copper circuitry including the tabs, pads and row drive lines, said pads being gold plated at least in their contact-providing areas, predetermined tabs on said other element being removed to provide a distinctive pattern of binary coded information, one of the plates of a unique capacitor at a selected bit position being eliminated to prevent capacitive coupling at such position and thus denote a binary "0," and a binary "1" being denoted at each such bit position where the tabs on said other element remain intact to permit capacitive coupling, the other side of the substrate having no conductive circuitry and being disposed in contact with said one element to constitute the dielectric between the respective sets of capacitors, the substrate being imitially clad with a substantially coextensive layer of copper at said one side of the substrate, and the copper circuitry being thereafter etched from the substrate, and unetched strips of copper provided adjacent opposite edges of said other element to provide an overall thickness adjacent said edges corresponding to the thickness of a conventional tabulating card, so that said other element may be punched and used interchangeably with conventional punched tabulating cards in existing tabulating equipment.

3. An information storage unit comprising, in combination:

a plurality of parallel arranged spaced printed circuit boards of substantially identical configuration having input terminals to which input signals are applied and output terminals from which output signals are taken, expandable means disposed between adjacent boards, ground shield means disposed at each side of said expandable means, dielectric means disposed at the opposite side of the ground shield means from the expandable means, and memory documents having conductive tabs carried by an insulative substrate to define unique patterns of coded indicia according to whether said tabs are present or absent at selected bit positions, said documents being mounted such that the tabs face said dielectric means, the insulative other sides of the documents being pressed into contact with the adjacent sides of adjacent boards upon expansion of the expandable means, and said boards having sets of conductive tabs provided thereon cooperating with the sets provided on the said documents to permit or prevent capacitive coupling at each particular bit position according to whether tabs are present or absent at such bit position of a particular document.

4. An information storage unit according to claim 3, further characterized by the provision of:

means for conveying input signals to a selectable part of the board, and means for conveying such signals from the board to corresponding conductive areas of the document via conductive lines provided on the ground shield means.

5. An information storage unit comprising, in combination:

at least one circuit board having input terminals to which input signals are applied and output terminals from which output signals are taken, and also having conductive tabs provided on an insulative substrate and arranged in columns and rows, with those tabs in each column being serially connected to each other and to a respective output terminal, at least one memory document having conductive tabs on one side of an insulative substrate and adapted, where present, to overlie corresponding tabs on the board to provide unique capacitors at each point of overlay, the tabs in each row being coupled in parallel to a distinctive row drive line to form a distinctive word of binary "1's" and "0's" depending on whether a particular tab is or is not so coupled, the opposite side of the insulative substrate facing the tabs on the board to provide the common dielectric for such unique capacitors, an electrostatic ground shield having a separate circuit line corresponding to each row line, and means including pins and staple-like contact members, for transmitting input signals from the board to the circuit lines and thence to the row line of a selectable row to cause outputs corresponding to the selected word.

References Cited

UNITED STATES PATENTS

| | | | |
|---|---|---|---|
| 3,233,227 | 2/1966 | Petschauer | 340—173 |
| 3,251,043 | 5/1966 | Haskell | 340—173 |

ing," IBM Technical Disclosure Bulletin, p. 36, vol. I,

OTHER REFERENCES

R. O. Huopama, "Printed Wiring Board Manufacturing," IBM Technical Disclosure Bulletin, p. 36, vol. I, No. 5, February 1959.

TERRELL W. FEARS, *Primary Examiner.*

BERNARD KONICK, *Examiner.*

J. F. BREIMAYER, *Assistant Examiner.*